United States Patent
Iwai et al.

(10) Patent No.: US 10,774,915 B2
(45) Date of Patent: Sep. 15, 2020

(54) BICYCLE SPROCKET ASSEMBLY

(71) Applicant: SHIMANO INC., Sakai (JP)

(72) Inventors: Tooru Iwai, Sakai (JP); Tetsu Nonoshita, Sakai (JP); Toyoshi Yoshida, Sakai (JP)

(73) Assignee: SHIMANO INC., Sakai (JP)

( * ) Notice: Subject to any disclaimer, the term of this patent is extended or adjusted under 35 U.S.C. 154(b) by 378 days.

(21) Appl. No.: 15/608,931

(22) Filed: May 30, 2017

(65) Prior Publication Data

US 2018/0346066 A1    Dec. 6, 2018

(51) Int. Cl.
| | |
|---|---|
| *B62M 9/10* | (2006.01) |
| *F16H 55/30* | (2006.01) |
| *B60B 27/02* | (2006.01) |
| *F16H 7/06* | (2006.01) |

(52) U.S. Cl.
CPC ........... *F16H 55/30* (2013.01); *B60B 27/023* (2013.01); *B62M 9/10* (2013.01); *B60B 2360/104* (2013.01); *B60B 2360/34* (2013.01); *B60B 2360/341* (2013.01); *B60B 2360/3416* (2013.01); *F16H 7/06* (2013.01)

(58) Field of Classification Search
CPC ......... B62M 9/10; B62M 9/105; F16H 55/30; F16H 7/06
See application file for complete search history.

(56) References Cited

U.S. PATENT DOCUMENTS

| | | | |
|---|---|---|---|
| 8,911,314 B2 | 12/2014 | Braedt | |
| 9,150,280 B2 | 10/2015 | Braedt | |
| 9,308,967 B2 | 4/2016 | Braedt | |
| 2005/0032596 A1* | 2/2005 | Nonoshita | B62K 19/16 474/175 |
| 2007/0265122 A1* | 11/2007 | Emura | B62M 9/105 474/152 |
| 2008/0230344 A1 | 9/2008 | Braedt | |
| 2010/0075791 A1* | 3/2010 | Braedt | B62M 9/10 474/160 |
| 2012/0196711 A1* | 8/2012 | Loy | B62M 9/10 474/160 |
| 2014/0364259 A1* | 12/2014 | Reiter | F16H 55/30 474/155 |
| 2017/0043840 A1 | 2/2017 | Reinbold et al. | |

FOREIGN PATENT DOCUMENTS

| | | |
|---|---|---|
| EP | 1074462 | 2/2001 |

* cited by examiner

*Primary Examiner* — Michael R Mansen
*Assistant Examiner* — Robert T Reese
(74) *Attorney, Agent, or Firm* — Mori & Ward, LLP

(57) ABSTRACT

A bicycle sprocket assembly comprises a plurality of sprockets and a first support element. The plurality of sprockets is arranged coaxially about a rotational center axis of the bicycle sprocket assembly. The plurality of sprockets includes a first sprocket. The first sprocket includes a first toothed ring and a first sprocket body at least partly disposed radially inwardly of the first toothed ring with respect to the rotational center axis. The first toothed ring is made of a first material. The first sprocket body is made of a second material that is different from the first material. The first support element extends from the first sprocket to a second sprocket adjacent to the first sprocket in an axial direction with respect to the rotational center axis. The first support element is made of a first additional material that is different from the second material.

21 Claims, 15 Drawing Sheets

BICYCLE SPROCKET ASSEMBLY

BACKGROUND OF THE INVENTION

Field of the Invention

The present invention relates to a bicycle sprocket assembly.

Discussion of the Background

Bicycling is becoming an increasingly more popular than of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket assembly.

SUMMARY OF THE INVENTION

In accordance with a first aspect of the present invention, a bicycle sprocket assembly comprises a plurality of sprockets and a first support element. The plurality of sprockets is arranged coaxially about a rotational center axis of the bicycle sprocket assembly. The plurality of sprockets includes a first sprocket. The first sprocket includes a first toothed ring and a first sprocket body at least partly disposed radially inwardly of the first toothed ring with respect to the rotational center axis. The first toothed ring is made of a first material. The first sprocket body is made of a second material that is different from the first material. The first support element extends from the first sprocket to a second sprocket adjacent to the first sprocket in an axial direction with respect to the rotational center axis. The first support element is made of a first additional material that is different from the second material.

With the bicycle sprocket assembly according to the first aspect, it is possible to improve a degree of freedom of designing the bicycle sprocket assembly by choosing the first to third materials.

In accordance with a second aspect of the present invention, a bicycle sprocket assembly comprises a plurality of sprockets arranged coaxially about a rotational center axis of the bicycle sprocket assembly. The plurality of sprockets includes a first sprocket and a second sprocket. The first sprocket includes a first toothed ring and a first sprocket body at least partly disposed radially inwardly of the first toothed ring with respect to the rotational center axis. The first toothed ring is made of a first material. The first sprocket body is made of a second material that is different from the first material. The second sprocket includes a second toothed ring made of a third material that is different from the second material.

With the bicycle sprocket assembly according to the second aspect, it is possible to improve a degree of freedom of designing the bicycle sprocket assembly by choosing the first and second materials.

In accordance with a third aspect of the present invention, the bicycle sprocket assembly according to the first or second aspect is configured so that the first support element is attached to the first toothed ring.

With the bicycle sprocket assembly according to the third aspect, it is possible to improve strength of the bicycle sprocket assembly.

In accordance with a fourth aspect of the present invention, the bicycle sprocket assembly according to the first or second aspect is configured so that the first support element is integrally provided with the first toothed ring as a one-piece unitary member.

With the bicycle sprocket assembly according to the fourth aspect, it is possible to improve strength of the bicycle sprocket assembly.

In accordance with a fifth aspect of the present invention, the bicycle sprocket assembly according to the first or second aspect is configured so that the plurality of sprockets includes the second sprocket. The first support element is provided between the first sprocket and the second sprocket in the axial direction. The second sprocket includes a second toothed ring. The first support element is integrally provided with the second toothed ring as a one-piece unitary member.

With the bicycle sprocket assembly according to the fifth aspect, it is possible to improve strength of the bicycle sprocket assembly.

In accordance with a sixth aspect of the present invention, the bicycle sprocket assembly according to the fifth aspect is configured so that the first support element is integrally provided with the first toothed ring and the second toothed ring as a one-piece unitary member.

With the bicycle sprocket assembly according to the sixth aspect, it is possible to further improve strength of the bicycle sprocket assembly.

In accordance with a seventh aspect of the present invention, the bicycle sprocket assembly according to the sixth aspect is configured so that the second toothed ring is made of a third material. The third material is different from the second material and is equal to the first material and the first additional material.

With the bicycle sprocket assembly according to the seventh aspect, it is possible to easily manufacture the bicycle sprocket assembly.

In accordance with an eighth aspect of the present invention, the bicycle sprocket assembly according to the first or second aspect is configured so that the first support element is a separate member from the first toothed ring.

With the bicycle sprocket assembly according to the eighth aspect, it is possible to improve manufacturability of the bicycle sprocket assembly.

In accordance with a ninth aspect of the present invention, the bicycle sprocket assembly according to the eighth aspect is configured so that the plurality of sprockets includes the second sprocket. The first support element is provided between the first sprocket and the second sprocket in the axial direction. The second sprocket includes a second toothed ring. The first support element is a separate member from the first toothed ring and the second toothed ring.

With the bicycle sprocket assembly according to the ninth aspect, it is possible to improve manufacturability of the bicycle sprocket assembly.

In accordance with a tenth aspect of the present invention, the bicycle sprocket assembly according to the ninth aspect is configured so that the second toothed ring is made of a third material. The third material is different from the second material and is equal to the first material.

With the bicycle sprocket assembly according to the tenth aspect, it is possible to improve the degree of freedom of designing the bicycle sprocket assembly with improving manufacturability of the bicycle sprocket assembly.

In accordance with an eleventh aspect of the present invention, the bicycle sprocket assembly according to the tenth aspect is configured so that the first additional material is different from the first material and the third material.

With the bicycle sprocket assembly according to the eleventh aspect, it is possible to improve manufacturability of the bicycle sprocket assembly with improving the degree of freedom of designing the bicycle sprocket assembly.

In accordance with a twelfth aspect of the present invention, the bicycle sprocket assembly according to the first or second aspect is configured so that the first material includes a metallic material. The second material includes at least one of a non-metallic material and a metallic material. The first additional material includes at least one of a non-metallic material and a metallic material.

With the bicycle sprocket assembly according to the twelfth aspect, it is possible to save a weight of the bicycle sprocket assembly.

In accordance with a thirteenth aspect of the present invention, the bicycle sprocket assembly according to the first or second aspect is configured so that the plurality of sprockets includes the second sprocket. The first support element is provided between the first sprocket and the second sprocket in the axial direction. The second sprocket includes a second toothed ring. An internal cavity is provided radially inwardly of the second sprocket.

With the bicycle sprocket assembly according to the thirteenth aspect, it is possible to further save a weight of the bicycle sprocket assembly.

In accordance with a fourteenth aspect of the present invention, the bicycle sprocket assembly according to the thirteenth aspect is configured so that the internal cavity is provided on an axial side of the first sprocket body.

With the bicycle sprocket assembly according to the fourteenth aspect, it is possible to further save the weight of the bicycle sprocket assembly.

In accordance with a fifteenth aspect of the present invention, the bicycle sprocket assembly according to the first or second aspect further comprises a hub engagement structure provided on an inner periphery of the first sprocket body to engage with a bicycle hub assembly.

With the bicycle sprocket assembly according to the fifteenth aspect, it is possible to improve the degree of freedom of designing the bicycle sprocket assembly engageable with the bicycle hub assembly.

In accordance with a sixteenth aspect of the present invention, the bicycle sprocket assembly according to the first or second aspect is configured so that the first sprocket has a first pitch-circle diameter. The first pitch-circle diameter is the largest in the plurality of sprockets.

With the bicycle sprocket assembly according to the sixteenth aspect, it is possible to effectively save a weight of the bicycle sprocket assembly. For example, it is possible to effectively save the weight of the bicycle sprocket assembly in a case where a specific gravity of the second material is lower than a specific gravity of the first material.

In accordance with a seventeenth aspect of the present invention, the bicycle sprocket assembly according to the first or second aspect is configured so that the first sprocket body includes a first body and at least one projection extending radially outwardly from the first body.

With the bicycle sprocket assembly according to the seventeenth aspect, it is possible to effectively save a weight of the bicycle sprocket assembly. For example, it is possible to effectively save the weight of the bicycle sprocket assembly when a specific gravity of the second material is lower than a specific gravity of the first material.

In accordance with an eighteenth aspect of the present invention, the bicycle sprocket assembly according to the seventeenth aspect is configured so that the first toothed ring has a root circle. A radially outer end of the at least one projection is provided radially outwardly of the root circle.

With the bicycle sprocket assembly according to the eighteenth aspect, it is possible to more effectively save the weight of the bicycle sprocket assembly. For example, it is possible to more effectively save the weight of the bicycle sprocket assembly when the specific gravity of the second material is lower than the specific gravity of the first material.

In accordance with a nineteenth aspect of the present invention, the bicycle sprocket assembly according to the first or second aspect is configured so that the first sprocket body has a maximum outer diameter larger than a maximum inner diameter of the first toothed ring.

With the bicycle sprocket assembly according to the nineteenth aspect, it is possible to effectively save a weight of the bicycle sprocket assembly. For example, it is possible to effectively save the weight of the bicycle sprocket assembly in a case where a specific gravity of the second material is lower than a specific gravity of the first material.

In accordance with a twentieth aspect of the present invention, the bicycle sprocket assembly according to the first or second aspect is configured so that the first sprocket body has a maximum outer diameter larger than a root circle diameter of the first toothed ring.

With the bicycle sprocket assembly according to the twentieth aspect, it is possible to effectively save a weight of the bicycle sprocket assembly. For example, it is possible to effectively save the weight of the bicycle sprocket assembly in a case where a specific gravity of the second material is lower than a specific gravity of the first material.

In accordance with a twenty-first aspect of the present invention, the bicycle sprocket assembly according to the first or second aspect is configured so that the first sprocket body has a projected area larger than a projected area of the first toothed ring when viewed in the axial direction.

With the bicycle sprocket assembly according to the twenty-first aspect, it is possible to effectively save a weight of the bicycle sprocket assembly. For example, it is possible to effectively save the weight of the bicycle sprocket assembly in a case where a specific gravity of the second material is lower than a specific gravity of the first material.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
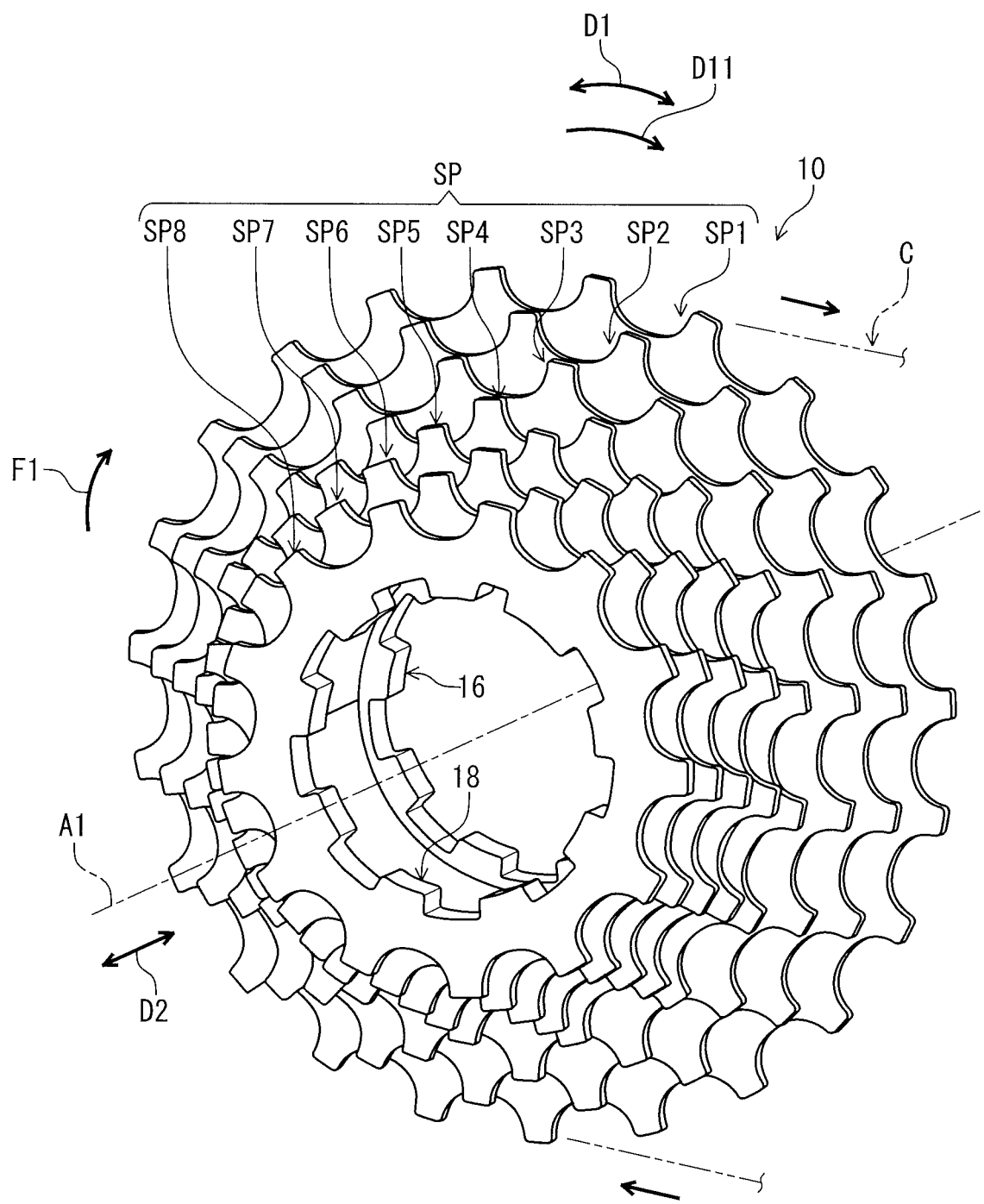
FIG. 1 is a perspective view of a bicycle sprocket assembly in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle sprocket assembly 10 in accordance with a first embodiment comprises a plurality of sprockets SP. The plurality of sprockets SP is arranged coaxially about a rotational center axis A1 of the bicycle sprocket assembly 10. The plurality of sprockets SP includes a first sprocket SP1 and a second sprocket SP2. In this embodiment, the plurality of sprockets SP further includes third to eighth sprockets SP3 to SP8. However, a total number of sprockets of the bicycle sprocket assembly 10 is not limited to this embodiment. The first to eighth sprockets SP1 to SP8 are arranged in an axial direction D2 parallel to the rotational center axis A1. In this embodiment, the bicycle sprocket assembly 10 is a rear sprocket assembly. However, structures of the bicycle sprocket assembly 10 can be applied to a front sprocket assembly.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle sprocket assembly 10, should be interpreted relative to the bicycle equipped with the bicycle sprocket assembly 10 as used in an upright riding position on a horizontal surface.

As seen in FIG. 1, the bicycle sprocket assembly 10 is rotatably supported by a bicycle hub assembly H relative to a bicycle frame (not shown) about the rotational center axis A1. The first to eighth sprockets SP1 to SP8 are engageable with a bicycle chain C to transmit a driving rotational force F1 between the bicycle chain C and the bicycle sprocket assembly 10. The bicycle sprocket assembly 10 is rotated about the rotational center axis A1 in a driving rotational direction D11 during pedaling. The driving rotational direction D11 is defined along a circumferential direction D1 of the bicycle sprocket assembly 10.

Figure 2:
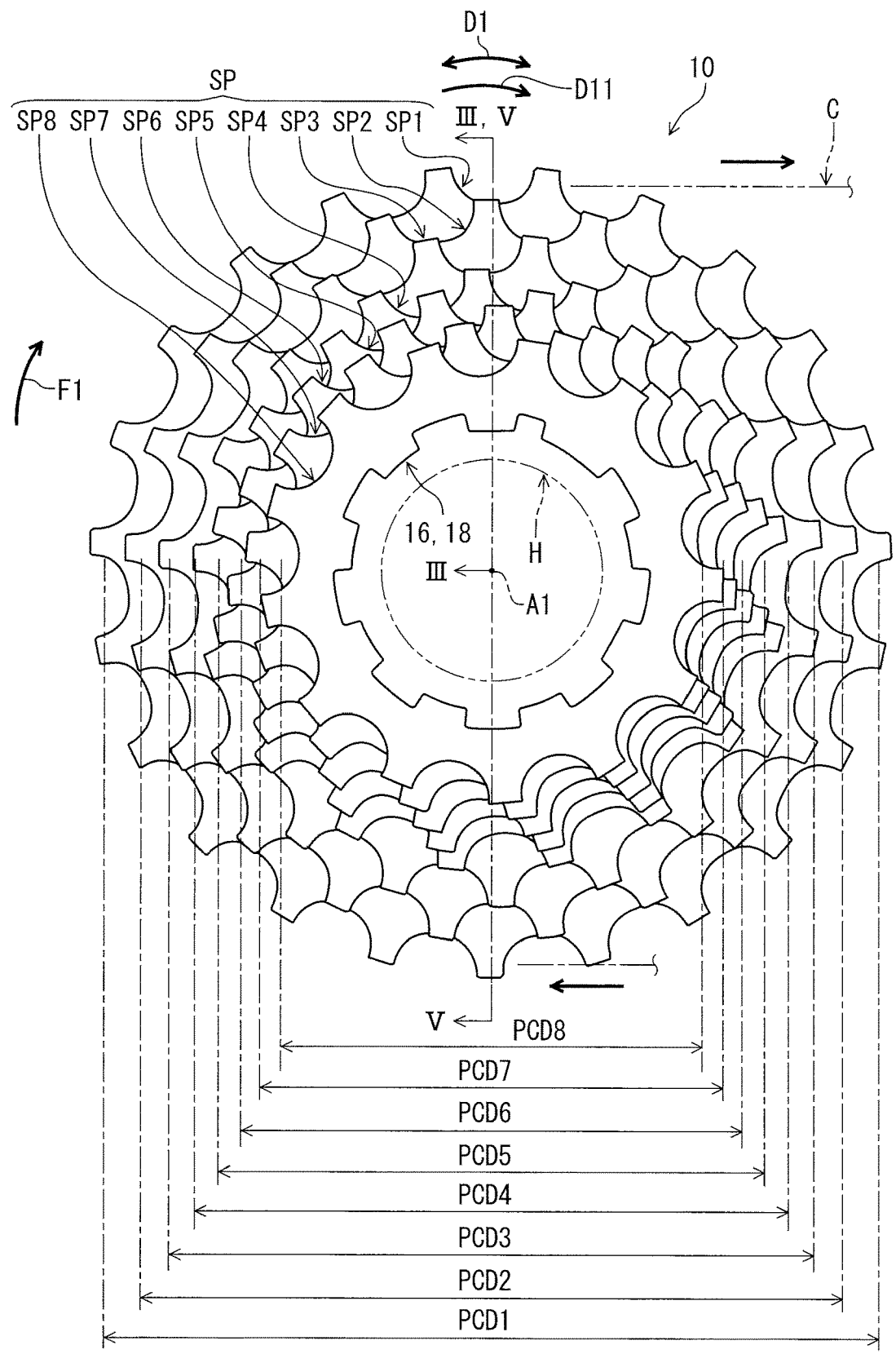
FIG. 2 is a side elevational view of the bicycle sprocket assembly illustrated in FIG. 1.

As seen in FIG. 2, the first sprocket SP1 has a first pitch-circle diameter PCD1. The second sprocket SP2 has a second pitch-circle diameter PCD2. The third to eighth sprockets respectively have third to eighth pitch-circle diameters PCD3 to PCD8. The first pitch-circle diameter PCD1 is the largest in the plurality of sprockets SP. The eighth pitch-circle diameter PCD8 is the smallest in the plurality of sprockets SP.

Figure 3:
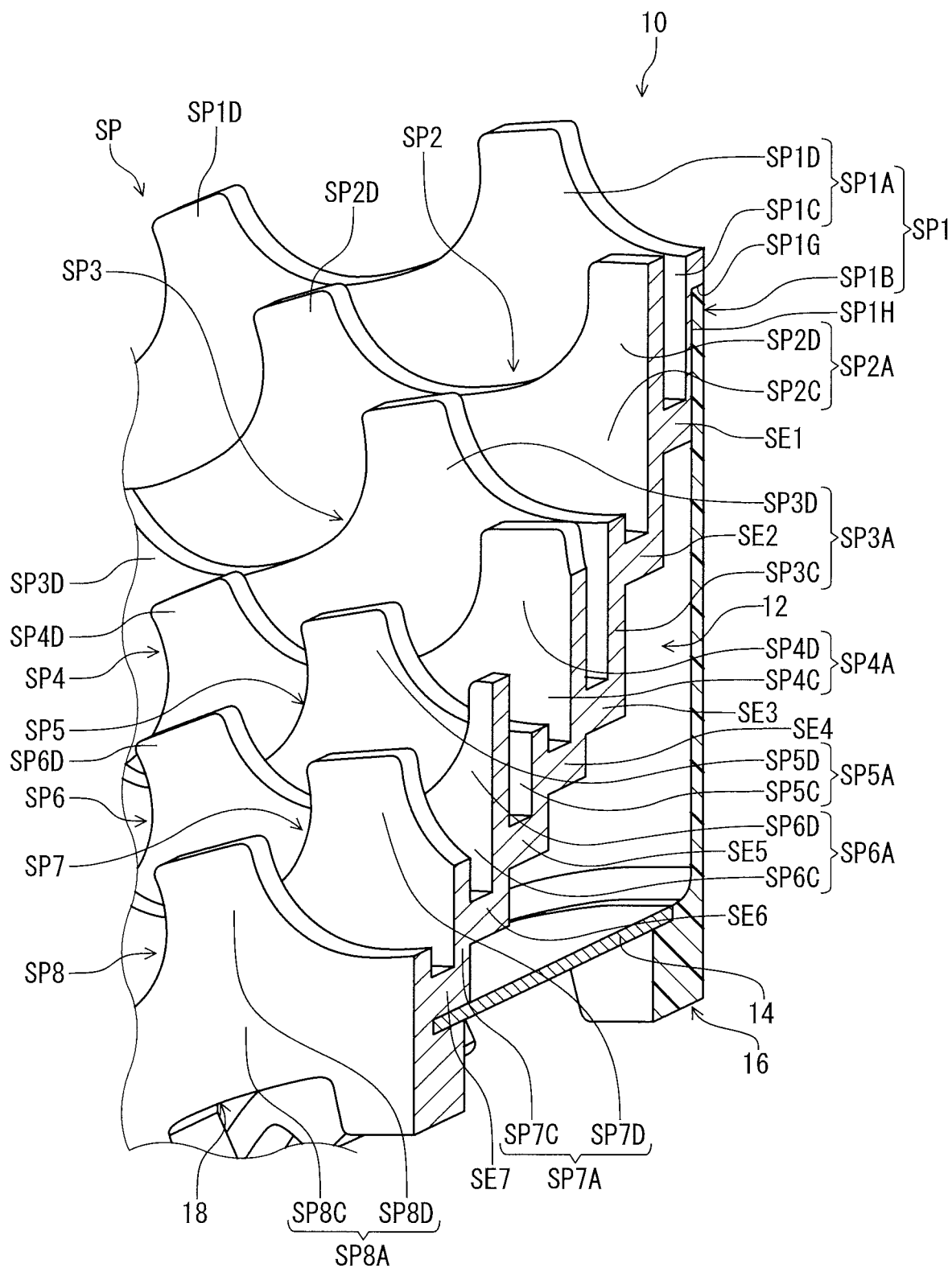
FIG. 3 is a cross-sectional perspective view of the bicycle sprocket assembly taken along line III-III of FIG. 2.

As seen in FIG. 3, the first sprocket SP1 includes a first toothed ring SP1A and a first sprocket body SP1B. The first sprocket body SP1B is at least partly disposed radially inwardly of the first toothed ring SP1A with respect to the rotational center axis A1. The first toothed ring SP1A is made of a first material. The first sprocket body SP1B is made of a second material that is different from the first material.

The first toothed ring SP1A includes a first ring SP1C and a plurality of first teeth SP1D. The plurality of first teeth SP1D extends radially outwardly from the first ring SP1C. The plurality of first teeth SP1D defines the first pitch-circle diameter PCD1 (FIG. 2).

Figure 4:
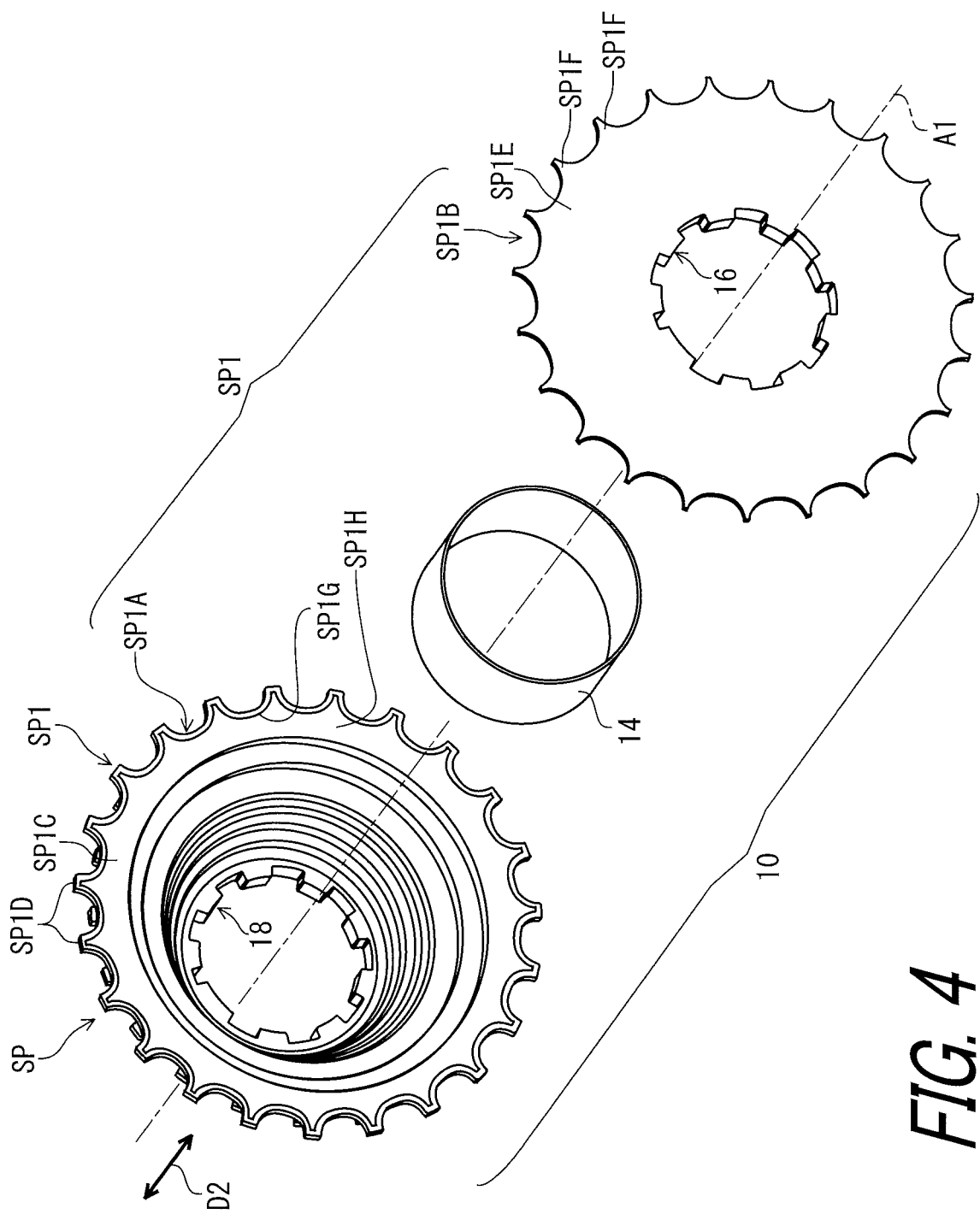
FIG. 4 is an exploded perspective view of the bicycle sprocket assembly illustrated in FIG. 1.

As seen in FIG. 4, the first sprocket body SP1B is a separate member from the first toothed ring SP1A. The first toothed ring SP1A includes a recess SP1G. The first sprocket body SP1B is provided in the recess SP1G. The recess SP1G has an outline corresponding to an outline of the first sprocket body SP1B.

As seen in FIGS. 3 and 4, the first toothed ring SP1A includes an attachment surface SP1H. The first sprocket body SP1B is attached to the attachment surface SP1H. In this embodiment, the first sprocket body SP1B is attached to the attachment surface SP1H with a bonding structure such as an adhesive agent. The attachment surface SP1H is provided on the first ring SP1C and the first teeth SP1D.

As seen in FIG. 3, the second sprocket SP2 includes a second toothed ring SP2A. The second toothed ring SP2A is made of a third material that is different from the second material. In this embodiment, the third material is equal to the first material. However, the third material can be different from the first material.

The second toothed ring SP2A includes a second ring SP2C and a plurality of second teeth SP2D. The plurality of second teeth SP2D extends radially outwardly from the second ring SP2C. The plurality of second teeth SP2D defines the second pitch-circle diameter PCD2 (FIG. 2).

The third sprocket SP3 includes a third toothed ring SP3A. The third toothed ring SP3A is made of the third material. The third toothed ring SP3A includes a third ring SP3C and a plurality of third teeth SP3D. The plurality of third teeth SP3D extends radially outwardly from the third ring SP3C. The plurality of third teeth SP3D defines the third pitch-circle diameter PCD3 (FIG. 2).

The fourth sprocket SP4 includes a fourth toothed ring SP4A. The fourth toothed ring SP4A is made of the third material. The fourth toothed ring SP4A includes a fourth ring SP4C and a plurality of fourth teeth SP4D. The plurality of fourth teeth SP4D extends radially outwardly from the fourth ring SP4C. The plurality of fourth teeth SP4D defines the fourth pitch-circle diameter PCD4 (FIG. 2).

The fifth sprocket SP5 includes a fifth toothed ring SP5A. The fifth toothed ring SP5A is made of the third material. The fifth toothed ring SP5A includes a fifth ring SP5C and a plurality of fifth teeth SP5D. The plurality of fifth teeth SP5D extends radially outwardly from the fifth ring SP5C. The plurality of fifth teeth SP5D defines the fifth pitch-circle diameter PCD5 (FIG. 2).

The sixth sprocket SP6 includes a sixth toothed ring SP6A. The sixth toothed ring SP6A is made of the third material. The sixth toothed ring SP6A includes a sixth ring SP6C and a plurality of sixth teeth SP6D. The plurality of sixth teeth SP6D extends radially outwardly from the sixth ring SP6C. The plurality of sixth teeth SP6D defines the sixth pitch-circle diameter PCD6 (FIG. 2).

The seventh sprocket SP7 includes a seventh toothed ring SP7A. The seventh toothed ring SP7A is made of the third material. The seventh toothed ring SP7A includes a seventh ring SP7C and a plurality of seventh teeth SP7D. The plurality of seventh teeth SP7D extends radially outwardly from the seventh ring SP7C. The plurality of seventh teeth SP7D defines the seventh pitch-circle diameter PCD7 (FIG. 2).

The eighth sprocket SP8 includes an eighth toothed ring SP8A. The eighth toothed ring SP8A is made of the third material. The eighth toothed ring SP8A includes an eighth ring SP8C and a plurality of eighth teeth SP8D. The plurality of eighth teeth SP8D extends radially outwardly from the eighth ring SP8C. The plurality of eighth teeth SP8D defines the eighth pitch-circle diameter PCD8 (FIG. 2).

Figure 5:
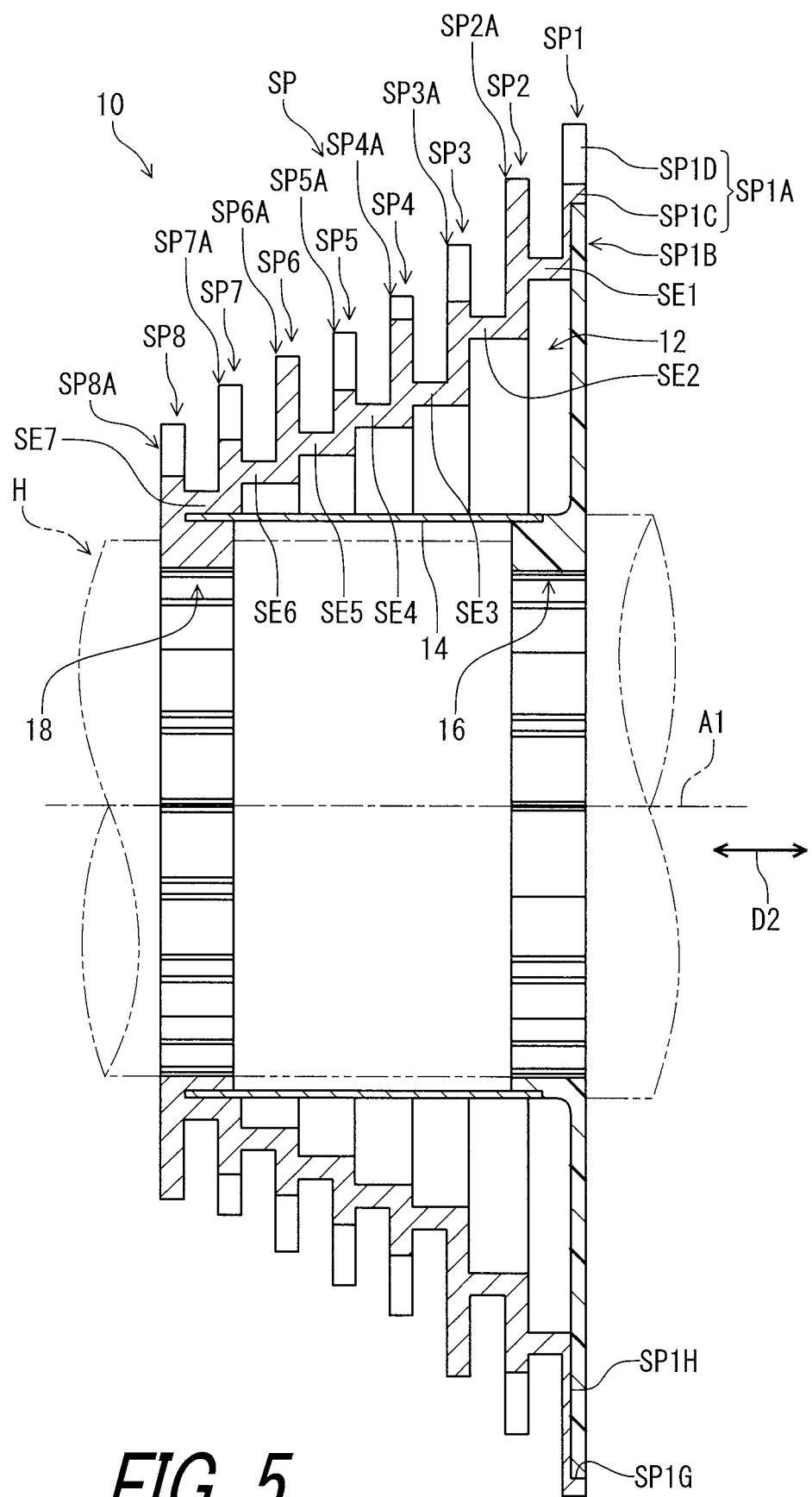
FIG. 5 is a cross-sectional view of the bicycle sprocket assembly taken along line V-V of FIG. 2.

As seen in FIG. 5, the bicycle sprocket assembly 10 comprises a first support element SE1. The first support element SE1 extends from the first sprocket SP1 to the second sprocket SP2 adjacent to the first sprocket SP1 in the axial direction D2 with respect to the rotational center axis A1. The first support element SE1 is provided between the first sprocket SP1 and the second sprocket SP2 in the axial direction D2. The first support element SE1 has an annular shape. However, the first support element SE1 can have another shape. For example, the first support element SE1 can include a plurality of separate parts.

The first support element SE1 is attached to the first toothed ring SP1A. The first support element SE1 is attached to the second toothed ring SP2A. In this embodiment, the first support element SE1 is integrally provided with the first toothed ring SP1A as a one-piece unitary member. The first support element SE1 is integrally provided with the second toothed ring SP2A as a one-piece unitary member. Namely, the first support element SE1 is integrally provided with the first toothed ring SP1A and the second toothed ring SP2A as a one-piece unitary member. However, the first support element SE1 can be a separate member from at least one of the first toothed ring SP1A and the second toothed ring SP2A.

The first support element SE1 is made of a first additional material that is different from the second material. In this embodiment, the third material is different from the second material and is equal to the first material and the first additional material. However, the third material can be different from at least one of the first material and the first additional material.

The first material includes a metallic material. Examples of the first material include iron, titanium, and aluminum. The first material can include a plurality of metallic materials. The second material includes at least one of a non-metallic material and a metallic material. Examples of the non-metallic material include a resin material and a carbon material. Examples of the resin material include a synthetic resin and a fiber reinforced plastic. Examples of the carbon material include a laminated carbon and a carbon-fiber reinforced plastic. Examples of the metallic material include iron, titanium, and aluminum. In this embodiment, the second material includes the non-metallic material. However, the second material can include the metallic material instead of or in addition to the non-metallic material.

The first additional material includes at least one of a non-metallic material and a metallic material. Examples of the non-metallic material include a resin material and a carbon material. Examples of the resin material include a synthetic resin and a fiber reinforced plastic. Examples of the carbon material include a laminated carbon and a carbon-fiber reinforced plastic. Examples of the metallic material include iron, titanium, and aluminum. In this embodiment, the first additional material includes the metallic material. However, the first additional material can include the non-metallic material instead of or in addition to the metallic material.

In this embodiment, a specific gravity of the second material is lower than a specific gravity of the first material. The specific gravity of the second material is lower than a specific gravity of the third material. The specific gravity of the second material is lower than a specific gravity of the first additional material. The specific gravity of the first material is substantially equal to the specific gravity of the third material and the specific gravity of the first additional material. However, the relationship between the above specific gravities is not limited to this embodiment. For example, the specific gravity of the first additional material can be lower than the specific gravities of the first material and the third material. The specific gravity of the first material can be different from the specific gravity of the third material and the specific gravity of the first additional material.

The bicycle sprocket assembly 10 comprises second to seventh support elements SE2 to SE7. The second to seventh support elements SE2 to SE7 have substantially the same structures as that of the first support element SE1. Thus, they will not be described in detail here for the sake of brevity.

The first to eighth toothed ring SP1A to SP8A and the first to seventh support elements SE1 to SE7 are integrally provided with each other as a one-piece unitary member. However, at least one of these members SP1A to SP8A and SE1 to SE7 can be a separate member from another of these members SP1A to SP8A and SE1 to SE7.

As seen in FIG. 5, an internal cavity 12 is provided radially inwardly of the second sprocket SP2. The internal cavity 12 is provided on an axial side of the first sprocket body SP1B. In this embodiment, the internal cavity 12 is provided radially inwardly of the second to sixth sprockets SP2 to SP6 and the first to sixth support elements SE1 to SE6. The first to seventh sprockets SP1 to SP7 and the first to sixth support elements SE1 to SE6 define the internal cavity 12.

As seen in FIGS. 3 and 5, the bicycle sprocket assembly 10 comprises an inner member 14. The inner member 14 extends from the first sprocket body SP1B to the eighth sprocket in the axial direction D2. The inner member 14 is provided between the first sprocket body SP1B and the eighth sprocket in the axial direction D2. The inner member 14 is provided radially inwardly of the second to seventh sprockets SP2 to SP7. The first to eighth sprockets SP1 to SP8, the first to seventh support elements SE1 to SE7, and the inner member 14 define the internal cavity 12. As seen in FIG. 4, the inner member 14 has a tubular shape. However, the shape of the inner member 14 is not limited to this embodiment. The inner member 14 can be omitted from the bicycle sprocket assembly 10.

As seen in FIG. 5, the bicycle sprocket assembly 10 further comprises a hub engagement structure 16. The hub engagement structure 16 is provided on an inner periphery of the first sprocket body SP1B to engage with the bicycle hub assembly H. The hub engagement structure 16 includes an internal spline engageable with an external spline of the bicycle hub assembly H. The hub engagement structure 16 is integrally provided with the first sprocket body SP1B as a one-piece unitary member. However, the hub engagement structure 16 can be a separate member from the first sprocket body SP1B. In such an embodiment, the hub engagement structure 16 can be made of a metallic material different from the second material of the first sprocket body SP1B.

The bicycle sprocket assembly 10 further comprises an additional hub engagement structure 18. The additional hub engagement structure 18 is provided on an inner periphery of the eighth sprocket SP8 to engage with the bicycle hub assembly H. The additional hub engagement structure 18 includes an internal spline engageable with the external spline of the bicycle hub assembly H. The additional hub engagement structure 18 is spaced apart from the hub engagement structure 16 in the axial direction D2. The additional hub engagement structure 18 is integrally provided with the eighth sprocket SP8 as a one-piece unitary member. However, the additional hub engagement structure 18 can be a separate member from the eighth sprocket SP8. In such an embodiment, the additional hub engagement structure 18 can be made of a non-metallic material different from the third material of the eighth sprocket SP8.

Figure 6:
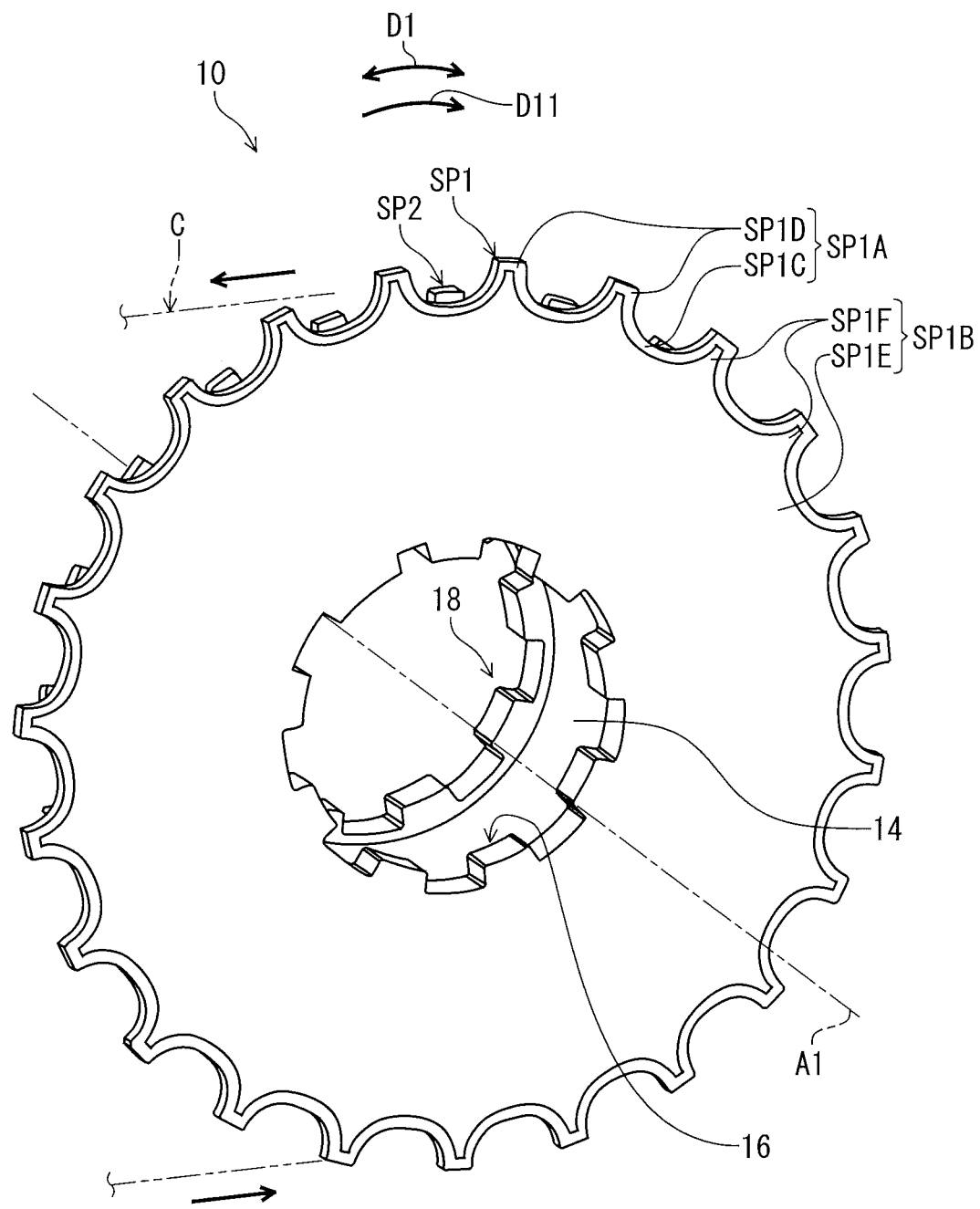
FIG. 6 is another perspective view of the bicycle sprocket assembly illustrated in FIG. 1.

As seen in FIG. 6, the first sprocket body SP1B includes a first body SP1E and at least one projection SP1F. The at least one projection SP1F extends radially outwardly from the first body SP1E. In this embodiment, the at least one projection SP1F includes a plurality of projections SP1F extending radially outwardly from the first body SP1E. The total number of the projections SP1F is equal to the total number of the first teeth SP1D. However, a total number of the projections SP1F is not limited to this embodiment.

Figure 7:
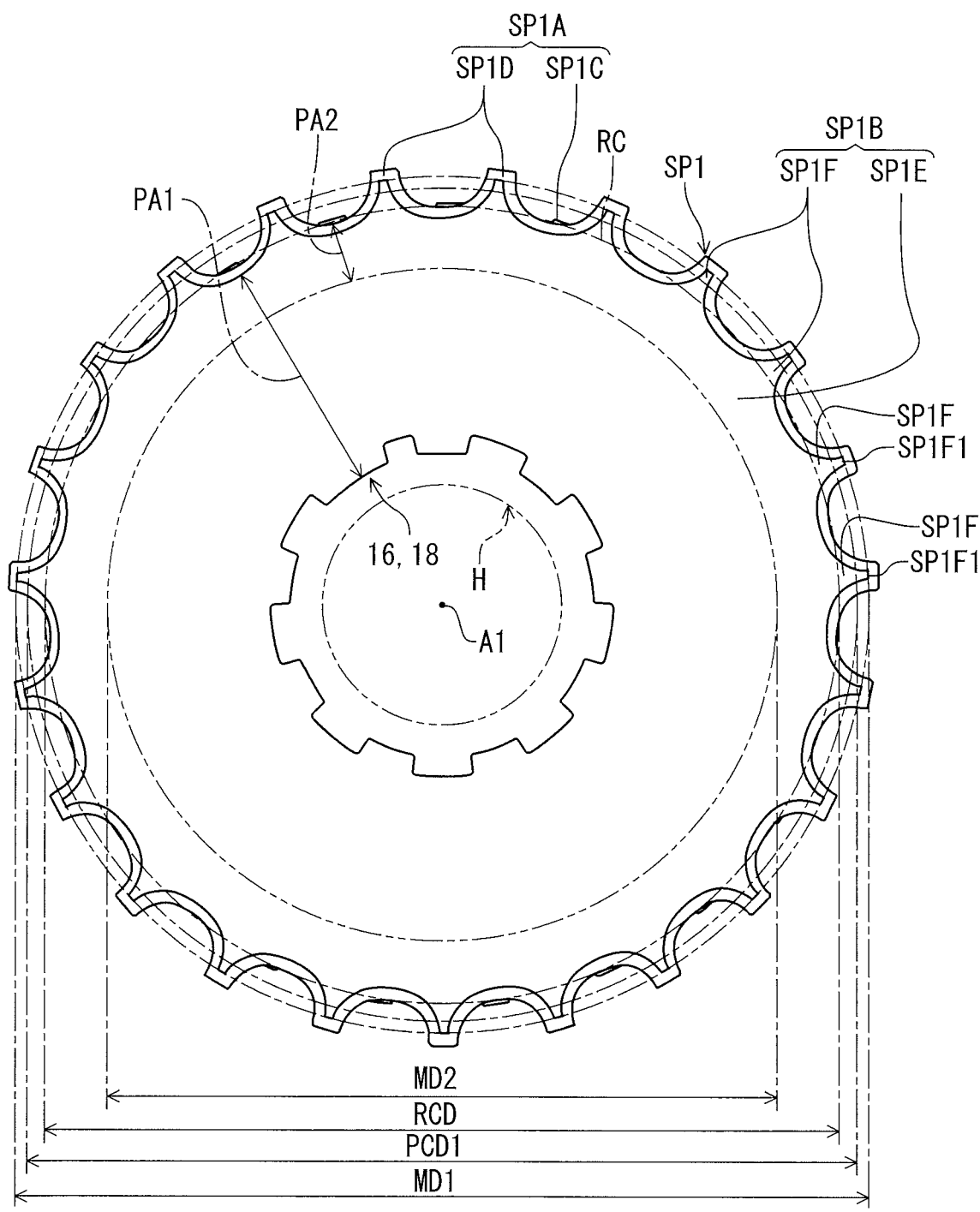
FIG. 7 is another side elevational view of the bicycle sprocket assembly illustrated in FIG. 1.

As seen in FIG. 7, the first toothed ring SP1A has a root circle RC. The root circle RC coincides with an outer periphery of the first ring SP1C of the first toothed ring SP1A. Tooth bottoms of the first toothed ring SP1A define the root circle RC. A radially outer end SP1F1 of the at least one projection SP1F is provided radially outwardly of the root circle RC. In this embodiment, a radially outer end SP1F1 of each of the projections SP1F is provided radially outwardly of the root circle RC. However, the radially outer end SP1F1 of at least one of the projections SP1F can be provided radially inwardly of the root circle RC.

The first sprocket body SP1B has a maximum outer diameter MD1 larger than a maximum inner diameter MD2 of the first toothed ring SP1A. The maximum outer diameter MD1 is larger than a root circle diameter RCD of the first toothed ring SP1A. The radially outer ends SP1F1 of the projections SP1F define the maximum outer diameter MD1. The maximum outer diameter MD1 is larger than the first pitch-circle diameter PCD1. However, the dimensional relationship between the above diameters is not limited to this embodiment. The maximum outer diameter MD1 can be smaller than the first pitch-circle diameter PCD1.

The first sprocket body SP1B has a projected area larger PA1 than a projected area PA2 of the first toothed ring SP1A when viewed in the axial direction D2. The projected area PA1 partly overlaps with the projected area PA2 when viewed in the axial direction D2. However, the projected area PA1 can be equal to or smaller than the projected area PA2.

Second Embodiment

A bicycle sprocket assembly 210 in accordance with a second embodiment will be described below referring to FIGS. 8 and 9. The bicycle sprocket assembly 210 has substantially the same structure as that of the bicycle sprocket assembly 10 except for the first to seventh support elements SE1 to SE7. Thus, elements having substantially the same function as those in the first embodiment will be numbered the same here, and will not be described and/or illustrated again in detail here for the sake of brevity.

Figure 8:
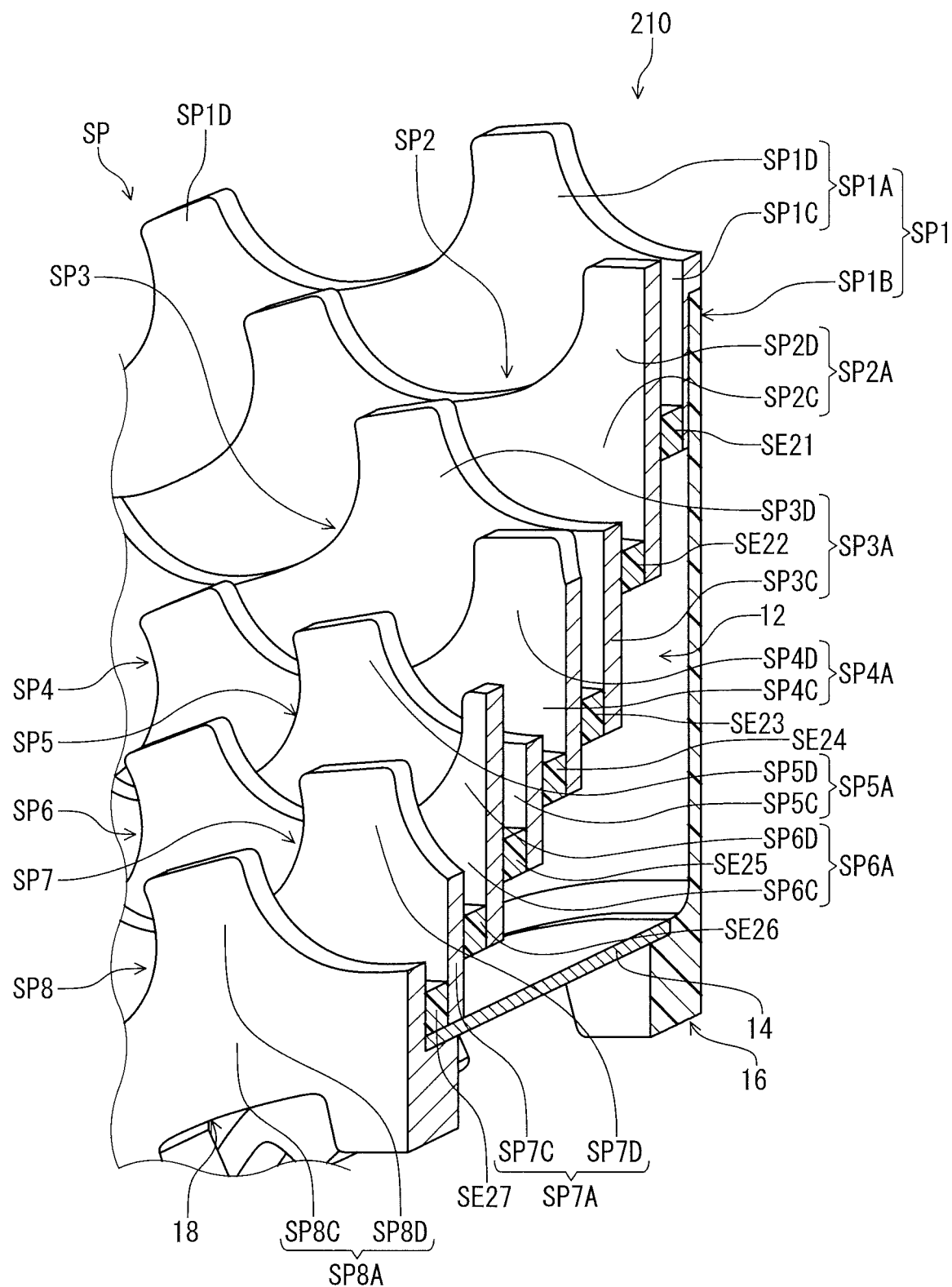
FIG. 8 is a cross-sectional perspective view of a bicycle sprocket assembly in accordance with a second embodiment.
Figure 9:
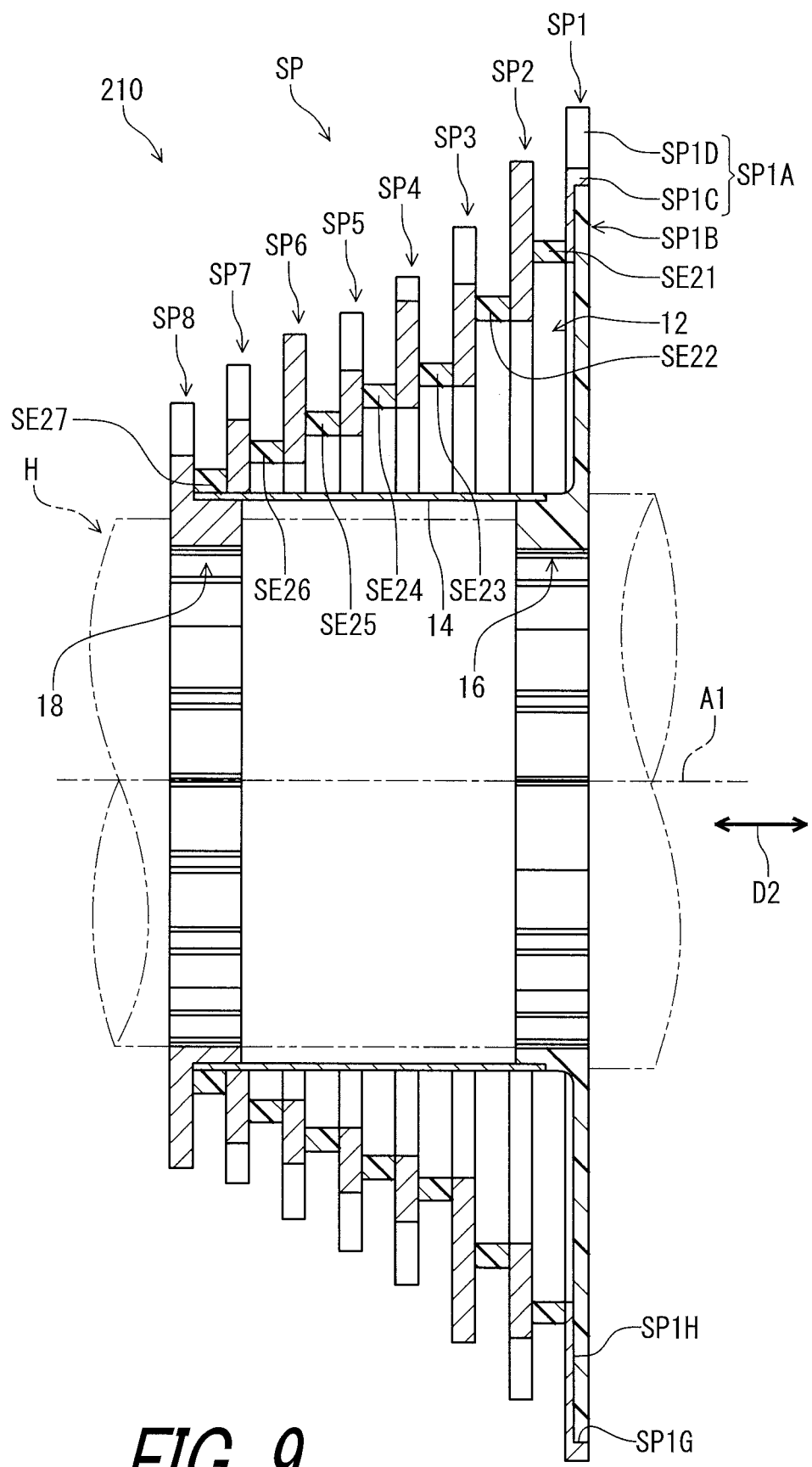
FIG. 9 is a cross-sectional view of the bicycle sprocket assembly illustrated in FIG. 8.

As seen in FIGS. 8 and 9, the bicycle sprocket assembly 210 comprises the plurality of sprockets SP and a first support element SE21. The first support element SE21 extends from the first sprocket SP1 to the second sprocket SP2 adjacent to the first sprocket SP1 in the axial direction D2 with respect to the rotational center axis A1. The first support element SE21 is provided between the first sprocket SP1 and the second sprocket SP2 in the axial direction D2. The first support element SE21 is secured to the first sprocket SP1 and the second sprocket SP2 with an adhesive agent, for example. The first support element SE21 has an annular shape. However, the first support element SE21 can have another shape. For example, the first support element SE21 can include a plurality of separate parts.

The first support element SE21 has substantially the same structure as that of the first support element SE1 of the first embodiment. In this embodiment, the first support element SE21 is a separate member from the first toothed ring SP1A. The first support element SE21 is a separate member from the second toothed ring SP2A. Namely, the first support element SE21 is a separate member from the first toothed ring SP1A and the second toothed ring SP2A. However, the first support element SE21 can be integrally provided with at least one of the first toothed ring SP1A and the second toothed ring SP2A as a one-piece unitary member.

The first support element SE21 is made of a first additional material that is different from the second material. In this embodiment, the first additional material is different from the first material and the third material. However, the first additional material can be the same as at least one of the first material and the third material.

The first additional material includes at least one of a non-metallic material and a metallic material. Examples of the non-metallic material include a resin material and a carbon material. Examples of the resin material include a synthetic resin and a fiber reinforced plastic. Examples of the carbon material include a laminated carbon and a carbon-fiber reinforced plastic. Examples of the metallic material include iron, titanium, and aluminum. In this embodiment, the first additional material includes the non-metallic material. However, the first additional material can include the metallic material instead of or in addition to the non-metallic material.

The bicycle sprocket assembly 210 comprises second to seventh support elements SE22 to SE27. The second to seventh support elements SE22 to SE27 have substantially the same structures as that of the first support element SE21. Thus, they will not be described in detail here for the sake of brevity.

Third Embodiment

A bicycle sprocket assembly 310 in accordance with a third embodiment will be described below referring to FIGS. 10 and 11. The bicycle sprocket assembly 310 has substantially the same structure as that of the bicycle sprocket assembly 10 except for the first to seventh support elements SE1 to SE7. Thus, elements having substantially the same function as those in the above embodiments will be numbered the same here, and will not be described and/or illustrated again in detail here for the sake of brevity.

Figure 10:
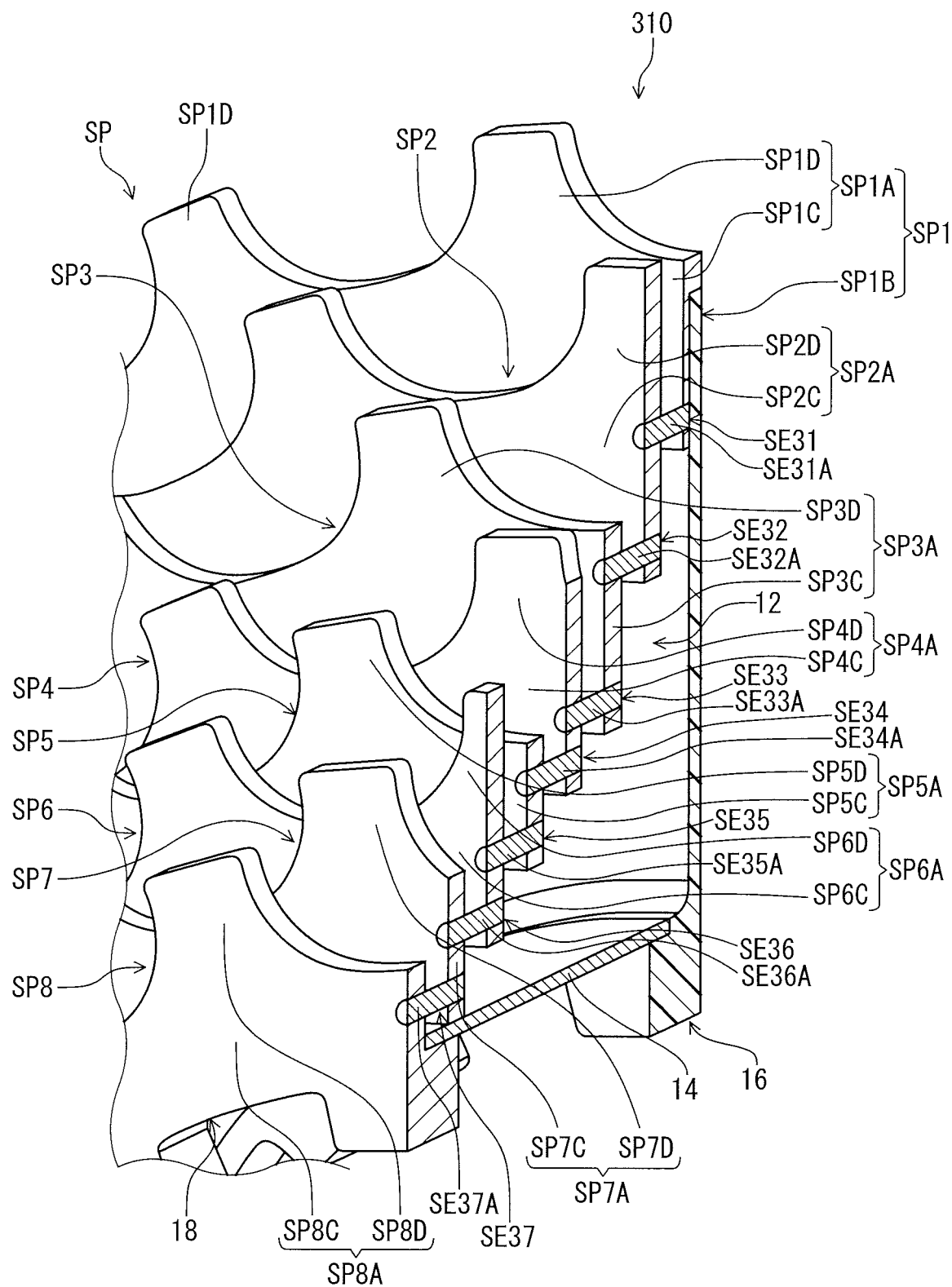
FIG. 10 is a cross-sectional perspective view of a bicycle sprocket assembly in accordance with a third embodiment.
Figure 11:
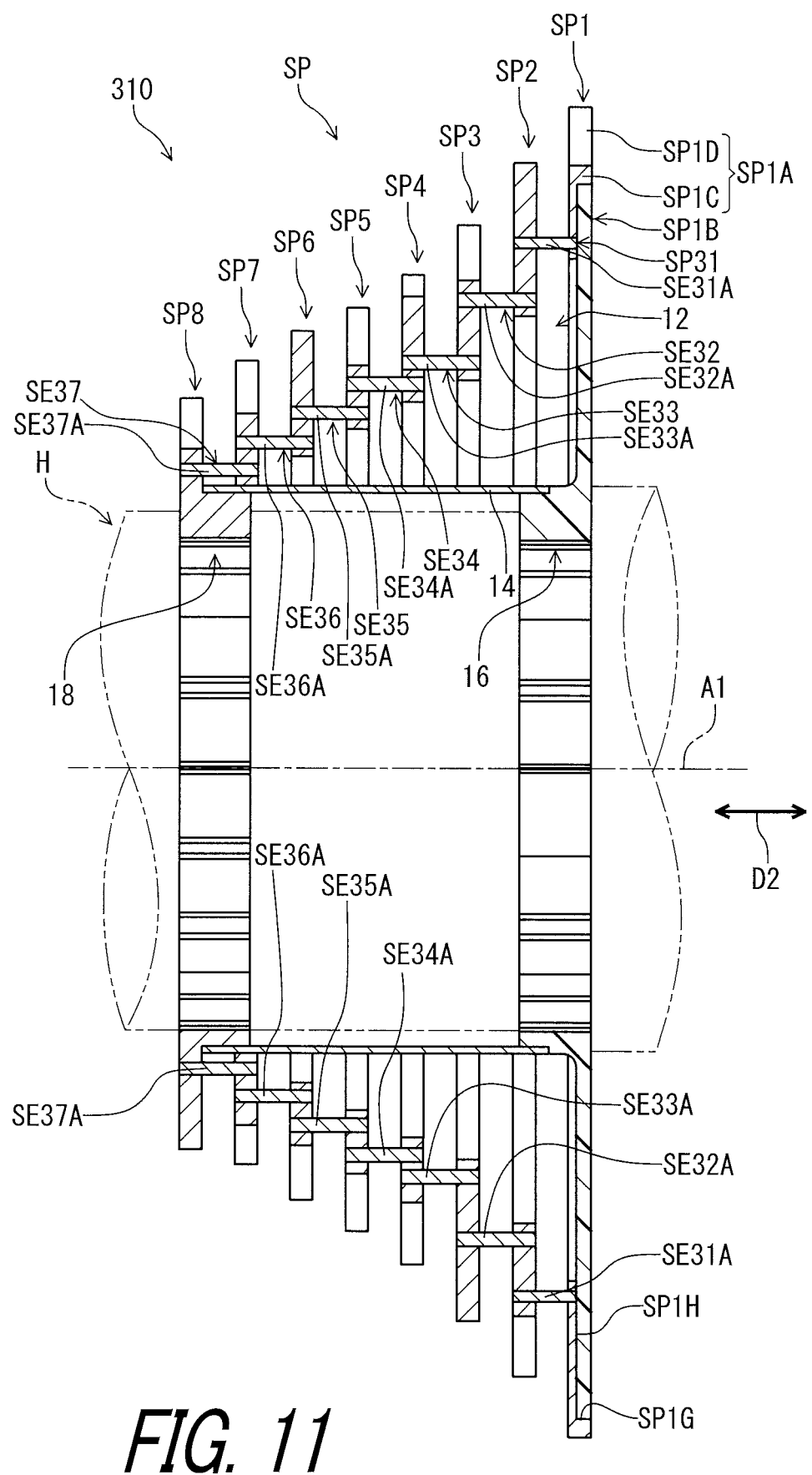
FIG. 11 is a cross-sectional view of the bicycle sprocket assembly illustrated in FIG. 10.

As seen in FIGS. 10 and 11, the bicycle sprocket assembly 310 comprises the plurality of sprockets SP and a first support element SE31. The first support element SE31 extends from the first sprocket SP1 to the second sprocket SP2 adjacent to the first sprocket SP1 in the axial direction D2 with respect to the rotational center axis A1. The first support element SE31 is provided between the first sprocket SP1 and the second sprocket SP2 in the axial direction D2.

In this embodiment, the first support element SE31 is a separate member from the first toothed ring SP1A. The first support element SE31 is a separate member from the second toothed ring SP2A. Namely, the first support element SE31 is a separate member from the first toothed ring SP1A and the second toothed ring SP2A. However, the first support element SE31 can be integrally provided with at least one of the first toothed ring SP1A and the second toothed ring SP2A as a one-piece unitary member.

In this embodiment, the first support element SE31 includes a plurality of separate parts. The first support element SE31 includes a plurality of first pins SE31A. The first pin SE31A couples the first toothed ring SP1A to the second toothed ring SP2A. The first pin SE31A is press-fitted in holes of the first toothed ring SP1A and the second toothed ring SP2A. The first pin SE1A can be secured to at least one of the first toothed ring SP1A and the second toothed ring SP2A with another bonding structure such as an adhesive agent. The first pin SE1A can be a rivet with which the first sprocket SP1 is secured to the second sprocket SP1. The first pins SE31A are circumferentially arranged with respect to the rotational center axis A1.

The first support element SE31 is made of a first additional material that is different from the second material. In this embodiment, the first additional material is different from the first material and the third material. However, the first additional material can be the same as at least one of the first material and the third material.

The first additional material includes at least one of a non-metallic material and a metallic material. Examples of the non-metallic material include a resin material and a carbon material. Examples of the resin material include a synthetic resin and a fiber reinforced plastic. Examples of the carbon material include a laminated carbon and a carbon-fiber reinforced plastic. Examples of the metallic material include iron, titanium, and aluminum. In this embodiment, the first additional material includes the metallic material. However, the first additional material can include the non-metallic material instead of or in addition to the metallic material.

The bicycle sprocket assembly 310 comprises second to seventh support elements SE32 to SE37. The second support element SE32 includes a plurality of second pins SE32A. The second pin SE32A couples the second toothed ring SP2A to the third toothed ring SP3A. The third support element SE33 includes a plurality of third pins SE33A. The third pin SE33A couples the third toothed ring SP3A to the fourth toothed ring SP4A. The fourth support element SE34 includes a plurality of fourth pins SE34A. The fourth pin SE34A couples the fourth toothed ring SP4A to the fifth toothed ring SP5A. The fifth support element SE35 includes a plurality of fifth pins SE35A. The fifth pin SE35A couples the fifth toothed ring SP5A to the sixth toothed ring SP6A. The sixth support element SE36 includes a plurality of sixth pins SE36A. The sixth pin SE36A couples the sixth toothed ring SP6A to the seventh toothed ring SP7A. The seventh support element SE37 includes a plurality of seventh pins SE37A. The seventh pin SE37A couples the seventh toothed ring SP7A to the eighth toothed ring SP8A. The second to seventh support elements SE32 to SE37 have substantially the same structures as that of the first support element SE31. Thus, they will not be described in detail here for the sake of brevity.

Fourth Embodiment

A bicycle sprocket assembly 410 in accordance with a third embodiment will be described below referring to FIGS. 12 to 14. The bicycle sprocket assembly 410 has substantially the same structure as that of the bicycle sprocket assembly 210 except for the first to eighth sprockets SP1 to SP8. Thus, elements having substantially the same function as those in the above embodiments will be numbered the same here, and will not be described and/or illustrated again in detail here for the sake of brevity.

Figure 12:
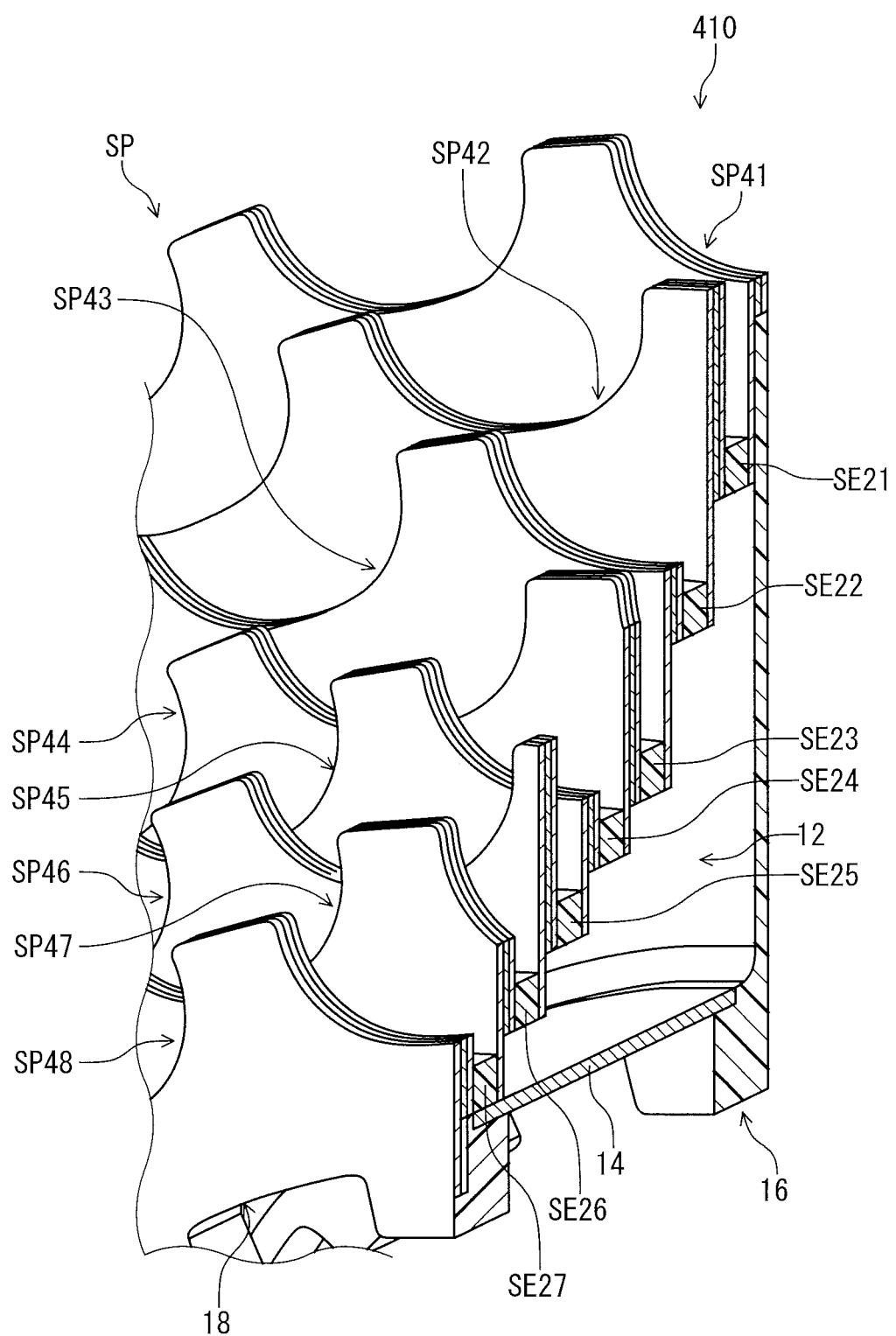
FIG. 12 is a cross-sectional perspective view of a bicycle sprocket assembly in accordance with a fourth embodiment.
Figure 13:
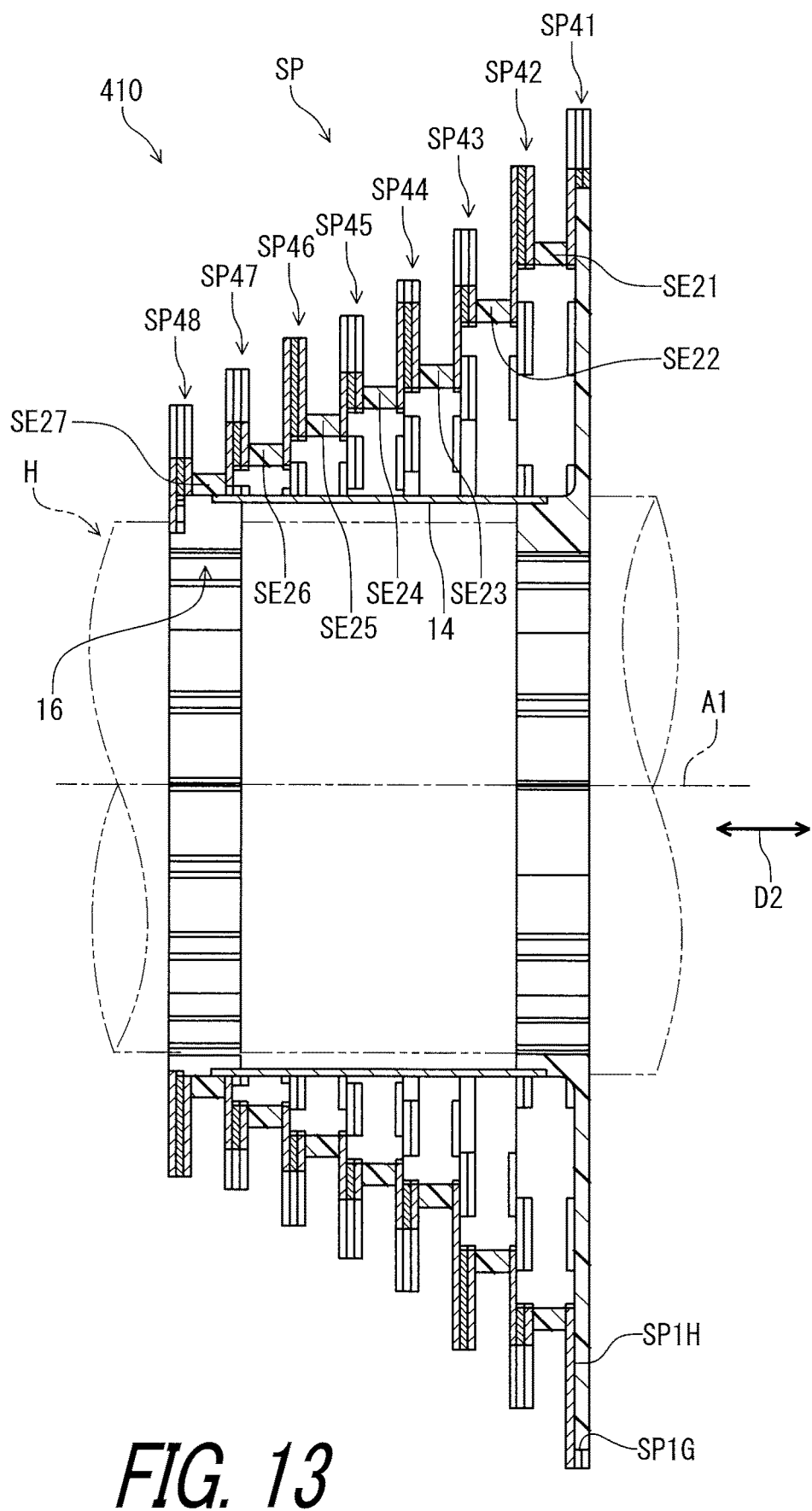
FIG. 13 is a cross-sectional view of the bicycle sprocket assembly illustrated in FIG. 12.

As seen in FIGS. 12 and 13, the bicycle sprocket assembly 410 comprises the plurality of sprockets SP and the first support element SE21. The plurality of sprockets SP includes a first sprocket SP41 and a second sprocket SP42. In this embodiment, the plurality of sprockets SP further includes third to eighth sprockets SP43 to SP48. However, a total number of sprockets is not limited to this embodiment. The first to eighth sprockets SP41 to SP48 are arranged in the axial direction D2. The additional hub engagement structure 18 is a separate member from the eight sprocket SP48 and is attached to the eighth sprocket SP48 with a boding structure such as an adhesive agent.

Figure 14:
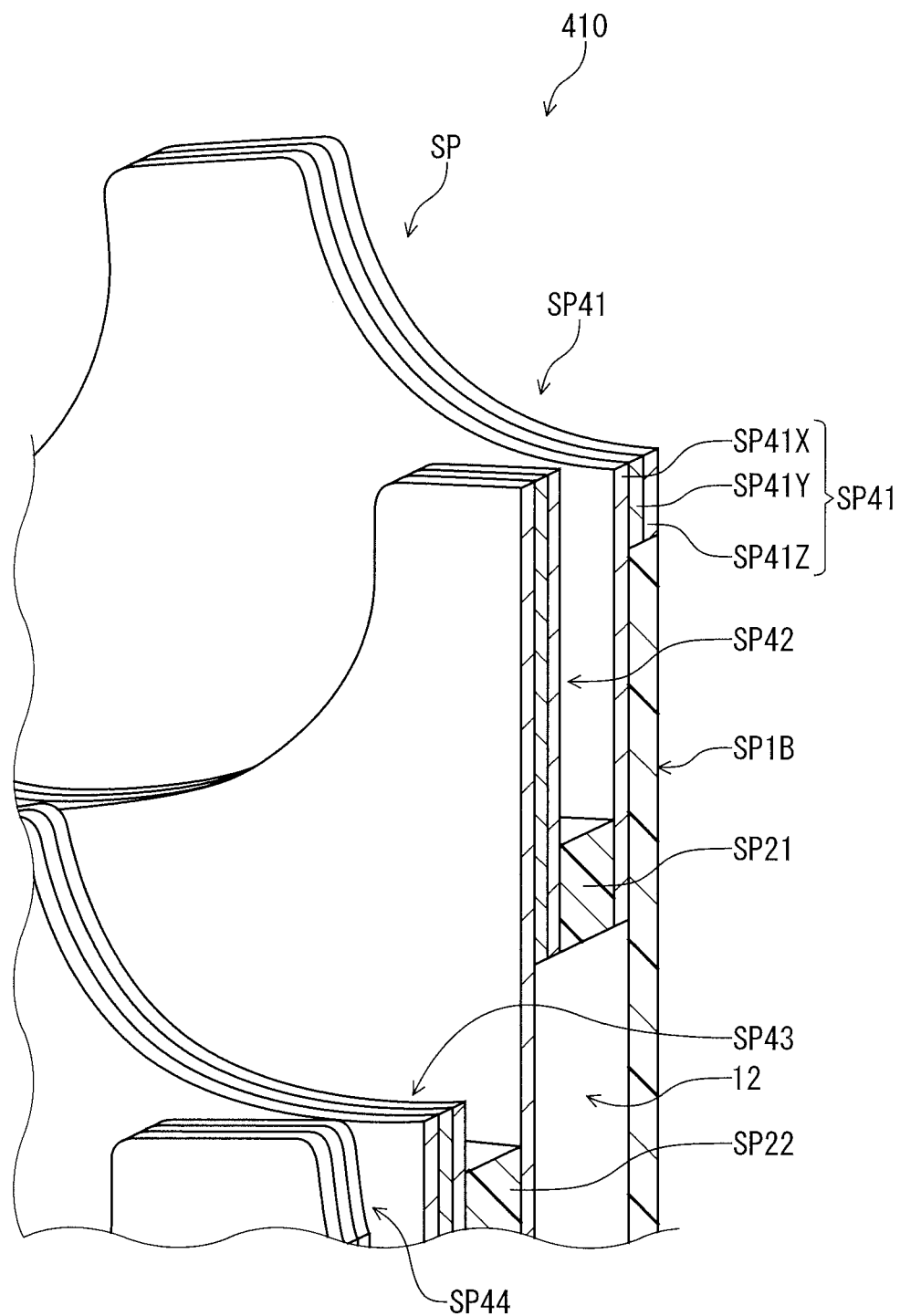
FIG. 14 is an enlarged cross-sectional perspective view of the bicycle sprocket assembly illustrated in FIG. 12.

As seen in FIG. 14, the first sprocket SP41 includes a first toothed ring SP41A and a first sprocket body SP1B. The first sprocket SP41 has substantially the same structure as that of the first sprocket SP1 of the first embodiment. In this embodiment, the first toothed ring SP41A is made of a first material and has a multi-layered structure with different materials. The first toothed ring SP41A includes a first layer SP41X, a second layer SP41Y, and a third layer SP41Z. The second layer is provided between the first layer and the third layer in the axial direction. The first layer is attached to the second layer with a boding structure such as an adhesive agent and diffusion bonding. The third layer is attached to the second layer with a boding structure such as an adhesive agent and diffusion bonding. A total number of layers of the first sprocket SP41 is not limited to this embodiment. The first sprocket SP41 can include at least two layers.

The first layer is made of a first layer material. The second layer is made of a second layer material. The third layer is made of a third layer material. Namely, the first material of the first toothed ring SP41A includes the first to third layer materials. The second layer material is different from the first layer material and the third layer material. The first layer material is the same as the third layer material. However, the first layer material can be different from the third layer material.

In this embodiment, the first layer material includes a metallic material. The second layer material includes at least one of a non-metallic material and a metallic material. The third layer material includes a metallic material. Examples of the non-metallic material include a resin material and a carbon material. Examples of the resin material include a synthetic resin and a fiber reinforced plastic. Examples of the carbon material include a laminated carbon and a carbon-fiber reinforced plastic. Examples of the metallic material include iron, titanium, and aluminum. In this embodiment, the second layer material includes the non-metallic material and is substantially the same as the second material of the first sprocket body SP1B. However, the second layer material can include the metallic material instead of or in addition to the non-metallic material.

As seen in FIGS. 12 and 13, the second to eighth sprockets SP42 to SP48 have substantially the same structure as that of the first toothed ring SP41A. Each of the second to eighth sprockets SP42 to SP48 has a multi-layered structure with different materials. Thus, they will not be described in detail here for the sake of brevity. At least one of the first to eighth sprockets SP41 to SP48 can be integrally provided as a one-piece unitary member.

Figure 15:
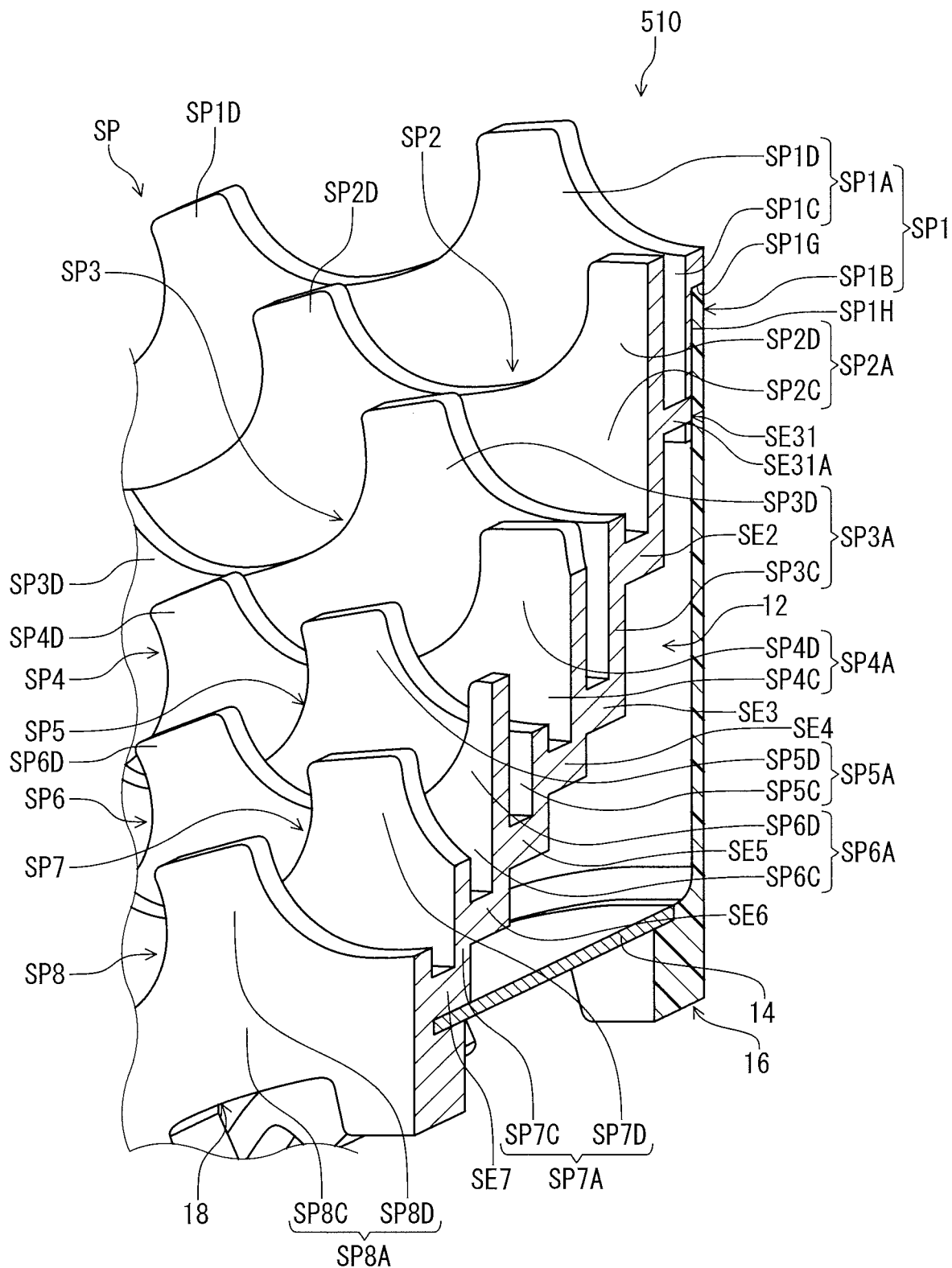
FIG. 15 is a cross-sectional perspective view of a bicycle sprocket assembly in accordance with a modification.

It will be apparent to those skilled in the bicycle field from the present disclosure that the above embodiments can be at least partly combined with each other if needed and/or desired. For example, as seen in FIG. 15, a bicycle sprocket assembly 510 comprises the first to eighth sprockets SP1 to SP8 and the second to seventh support elements SE2 to SE7 of the first embodiment. The second to eighth sprockets SP2 to SP8 and the second to seventh support elements SE2 to SE7 are integrally provided with each other as a one-piece unitary member. The bicycle sprocket assembly 510 comprises the first support element SE31 including the plurality of first pins SE31A of the third embodiment. The first pin SE31A is integrally provided with the second sprocket SP2 a one-piece unitary member. However, the first pin SE31A is a separate member from the first sprocket SP1. The first pin SE31A is press-fitted in a hole of the first sprocket SP1, for example.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle sprocket assembly comprising:
a plurality of sprockets arranged coaxially about a rotational center axis of the bicycle sprocket assembly, the plurality of sprockets including a first sprocket, the first sprocket including a first toothed ring and a first sprocket body at least partly disposed radially inwardly of the first toothed ring with respect to the rotational center axis, the first toothed ring being made of a first material, the first sprocket body being made of a second material that is different from the first material; and
a first support element extending from the first sprocket to a second sprocket adjacent to the first sprocket in an axial direction with respect to the rotational center axis, the first support element being made of a first additional material that is different from the second material, wherein
an internal cavity is provided radially inwardly of the second sprocket, the internal cavity being at least partially defined by the plurality of sprockets and an inner member extending in a direction parallel to the rotational center axis, and
the inner member has a first axial end attached to a first hub engagement structure of the bicycle sprocket assembly and a second axial end attached to a second hub engagement structure of the bicycle sprocket assembly, and the first hub engagement structure having a first internal spline engageable with an external spline of a bicycle hub assembly and the second hub engagement structure having a second internal spline engageable with the external spline of the bicycle hub assembly.

2. The bicycle sprocket assembly according to claim 1, wherein
the first support element is attached to the first toothed ring.

3. The bicycle sprocket assembly according to claim 1, wherein
the first support element is integrally provided with the first toothed ring as a one-piece unitary member.

4. The bicycle sprocket assembly according to claim 1, wherein
the plurality of sprockets includes the second sprocket,
the first support element is provided between the first sprocket and the second sprocket in the axial direction,
the second sprocket includes a second toothed ring, and
the first support element is integrally provided with the second toothed ring as a one-piece unitary member.

5. The bicycle sprocket assembly according to claim 4, wherein
the first support element is integrally provided with the first toothed ring and the second toothed ring as a one-piece unitary member.

6. The bicycle sprocket assembly according to claim 5, wherein
the second toothed ring is made of a third material, and
the third material is different from the second material and is equal to the first material and the first additional material.

7. The bicycle sprocket assembly according to claim 1, wherein
the first support element is a separate member from the first toothed ring.

8. The bicycle sprocket assembly according to claim 7, wherein
the plurality of sprockets includes the second sprocket,
the first support element is provided between the first sprocket and the second sprocket in the axial direction,
the second sprocket includes a second toothed ring, and
the first support element is a separate member from the first toothed ring and the second toothed ring.

9. The bicycle sprocket assembly according to claim 8, wherein
the second toothed ring is made of a third material, and
the third material is different from the second material and is equal to the first material.

10. The bicycle sprocket assembly according to claim 9, wherein
the first additional material is different from the first material and the third material.

11. The bicycle sprocket assembly according to claim 1, wherein
the first material includes a metallic material,
the second material includes at least one of a non-metallic material and a metallic material, and
the first additional material includes at least one of a non-metallic material and a metallic material.

12. The bicycle sprocket assembly according to claim 1, wherein
the plurality of sprockets includes the second sprocket,
the first support element is provided between the first sprocket and the second sprocket in the axial direction,
the second sprocket includes a second toothed ring,
the inner member extends between the first axial end and the second axial end in the direction parallel to the rotational center axis.

13. The bicycle sprocket assembly according to claim 12, wherein
the internal cavity is provided on an axial side of the first sprocket body.

14. The bicycle sprocket assembly according to claim 1, further wherein
the first hub engagement structure is provided on an inner periphery of the first sprocket body to engage with a bicycle hub assembly.

15. The bicycle sprocket assembly according to claim 1, wherein
the first sprocket has a first pitch-circle diameter, and
the first pitch-circle diameter is the largest in the plurality of sprockets.

16. The bicycle sprocket assembly according to claim 1, wherein
the first sprocket body includes a first body and at least one projection extending radially outwardly from the first body.

17. The bicycle sprocket assembly according to claim 16, wherein
the first toothed ring has a root circle, and
a radially outer end of the at least one projection is provided radially outwardly of the root circle.

18. The bicycle sprocket assembly according to claim 1, wherein
the first sprocket body has a maximum outer diameter larger than a maximum inner diameter of the first toothed ring.

19. The bicycle sprocket assembly according to claim 1, wherein
the first sprocket body has a maximum outer diameter larger than a root circle diameter of the first toothed ring.

20. The bicycle sprocket assembly according to claim 1, wherein
the first sprocket body has a projected area larger than a projected area of the first toothed ring when viewed in the axial direction.

21. A bicycle sprocket assembly comprising:
a plurality of sprockets arranged coaxially about a rotational center axis of the bicycle sprocket assembly, the plurality of sprockets including a first sprocket and a second sprocket,
the first sprocket including a first toothed ring and a first sprocket body at least partly disposed radially inwardly of the first toothed ring with respect to the rotational center axis, the first toothed ring being made of a first material, the first sprocket body being made of a second material that is different from the first material,
the second sprocket including a second toothed ring made of a third material that is different from the second material, wherein
an internal cavity is provided radially inwardly of the second sprocket, the internal cavity being at least partially defined by the plurality of sprockets and an inner member extending in a direction parallel to the rotational center axis, and
the inner member has a first axial end attached to a first hub engagement structure of the bicycle sprocket assembly and a second axial end attached to a second hub engagement structure of the bicycle sprocket assembly, and the first hub engagement structure having a first internal spline engageable with an external spline of a bicycle hub assembly and the second hub engagement structure having a second internal spline engageable with the external spline of the bicycle hub assembly.

* * * * *